United States Patent
Lee

(10) Patent No.: US 9,730,015 B1
(45) Date of Patent: *Aug. 8, 2017

(54) DETECTING LOCATION USING WIFI HOTSPOTS

(71) Applicant: Square, Inc., San Francisco, CA (US)

(72) Inventor: Bob Lee, San Francisco, CA (US)

(73) Assignee: Square, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/803,850

(22) Filed: Jul. 20, 2015

Related U.S. Application Data

(63) Continuation of application No. 13/801,340, filed on Mar. 13, 2013, now Pat. No. 9,113,344.

(60) Provisional application No. 61/613,815, filed on Mar. 21, 2012.

(51) Int. Cl.
*H04W 4/02* (2009.01)

(52) U.S. Cl.
CPC .................. *H04W 4/021* (2013.01)

(58) Field of Classification Search
CPC ....... H04W 4/02; H04W 64/00; H04W 4/023; H04W 4/028; H04W 84/12; H04M 1/72572; G01S 5/0252; G01S 5/021; G01S 5/0257
USPC .................................. 455/456.1–456.6, 457
See application file for complete search history.

(56) References Cited

U.S. PATENT DOCUMENTS

| | | | |
|---|---|---|---|
| 7,403,762 B2 * | 7/2008 | Morgan | G01S 5/02 340/572.4 |
| 9,055,400 B1 | 6/2015 | Lee | |
| 9,113,344 B1 | 8/2015 | Lee | |
| 2005/0048961 A1 | 3/2005 | Ribaudo et al. | |
| 2005/0266798 A1 | 12/2005 | Moloney et al. | |
| 2007/0030824 A1 | 2/2007 | Ribaudo et al. | |
| 2008/0242278 A1 | 10/2008 | Rekimoto | |
| 2011/0063138 A1 | 3/2011 | Berkobin et al. | |
| 2012/0052874 A1 | 3/2012 | Kumar | |
| 2012/0195295 A1 | 8/2012 | Elmaleh | |
| 2013/0157685 A1 * | 6/2013 | Young | 455/456.1 |
| 2013/0304898 A1 | 11/2013 | Aggarwal et al. | |
| 2014/0068719 A1 | 3/2014 | Kiukkonen et al. | |
| 2015/0031388 A1 | 1/2015 | Chatterjee et al. | |

OTHER PUBLICATIONS

U.S. Appl. No. 14/726,165, of Lee, B., filed May 29, 2015.
Restriction Requirement mailed Sep. 30, 2014, for U.S. Appl. No. 13/802,290, of Lee, B., filed Mar. 13, 2013.
Notice of Allowance mailed Feb. 6, 2015, for U.S. Appl. No. 13/802,290, of Lee, B., filed Mar. 13, 2013.

(Continued)

*Primary Examiner* — Nathan Mitchell
*Assistant Examiner* — Dung Lam
(74) *Attorney, Agent, or Firm* — Lee & Hayes, PLLC

(57) ABSTRACT

A method of detecting location includes receiving, on a mobile device, a plurality of previously stored WiFi hotspots; detecting, on the mobile device, a plurality of surrounding WiFi hotspots; comparing the plurality of surrounding WiFi hotspots to determine one or more differences between the plurality of previously stored WiFi hotspots; determining the differences satisfy a difference threshold; sending the plurality of surrounding WiFi hotspots to a location lookup system; and receiving a response from the location lookup system.

20 Claims, 6 Drawing Sheets

(56) References Cited

OTHER PUBLICATIONS

Notice of Allowance mailed Apr. 13, 2015, for U.S. Appl. No. 13/801,340, of Lee, B., filed Mar. 13, 2013.
Notice of Allowance mailed May 12, 2016, for U.S. Appl. No. 14/726,165, of Lee, B., filed May 29, 2015.
Non Final Office Action mailed Jan. 13, 2016, for U.S. Appl. No. 14/726,165, of Lee, B., filed May 29, 2015.
Non-Final Office Action dated Apr. 4, 2017, for U.S. Appl. No. 15/269,865, of Lee, B., filed Sep. 9, 2018.

* cited by examiner

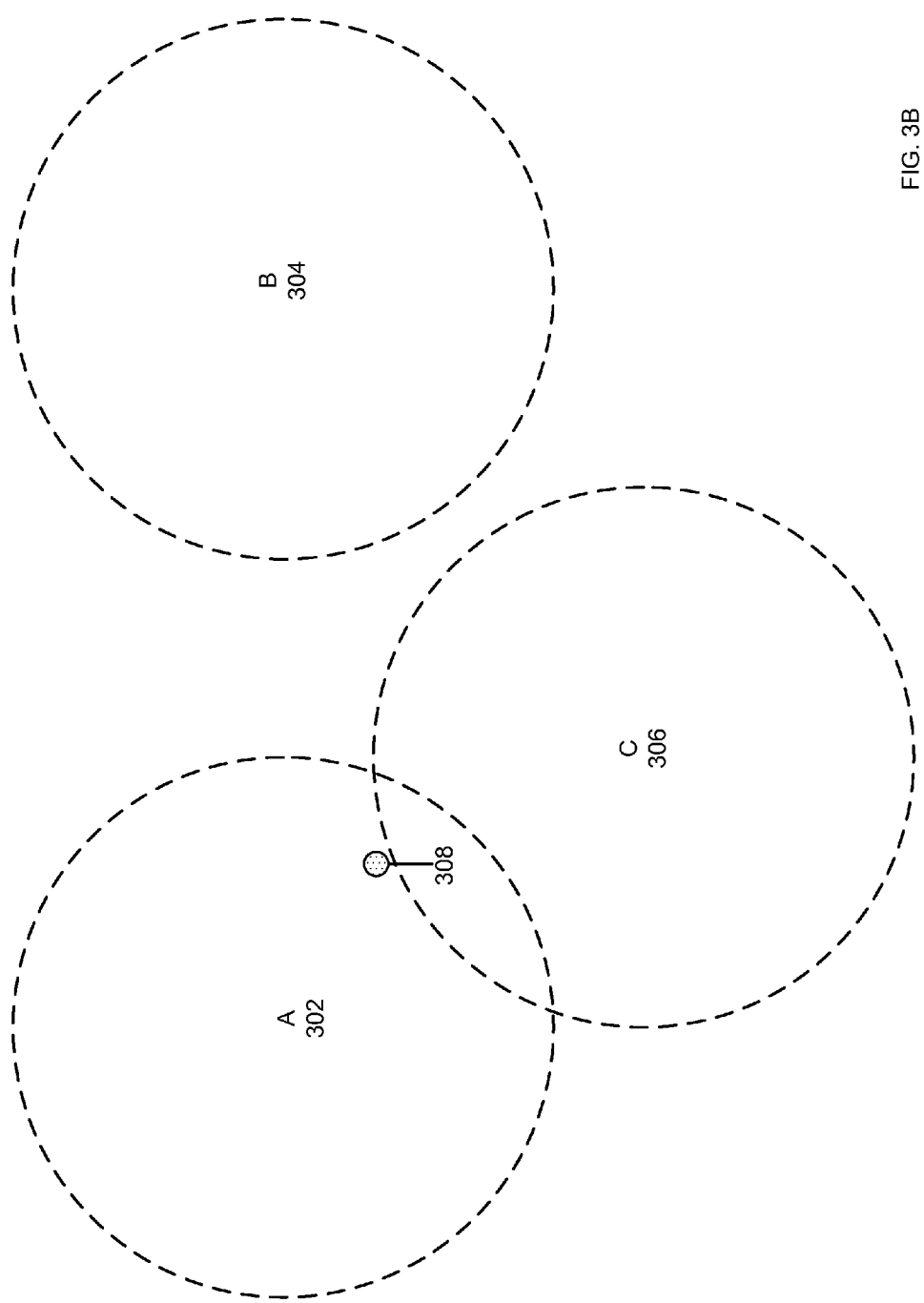

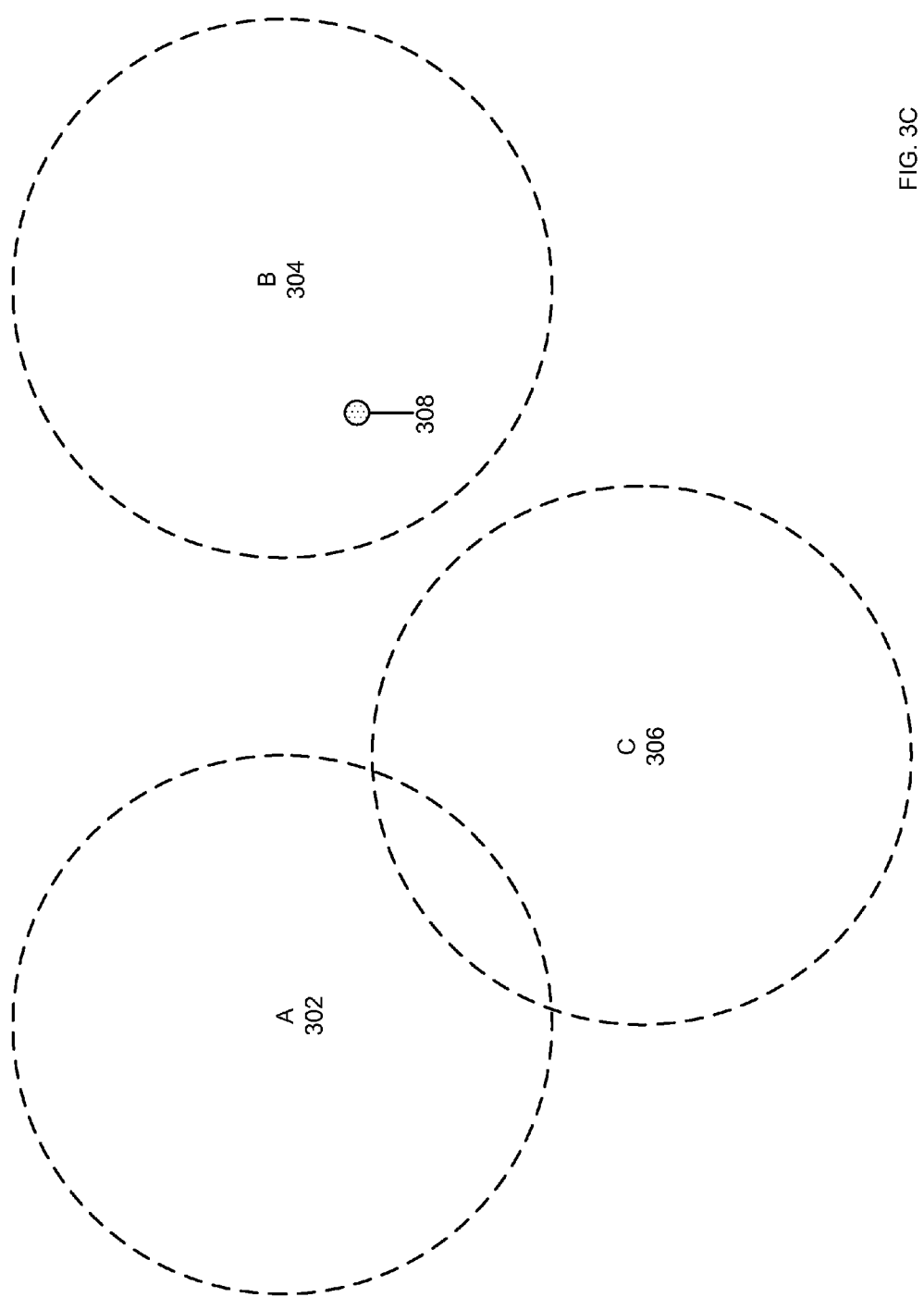

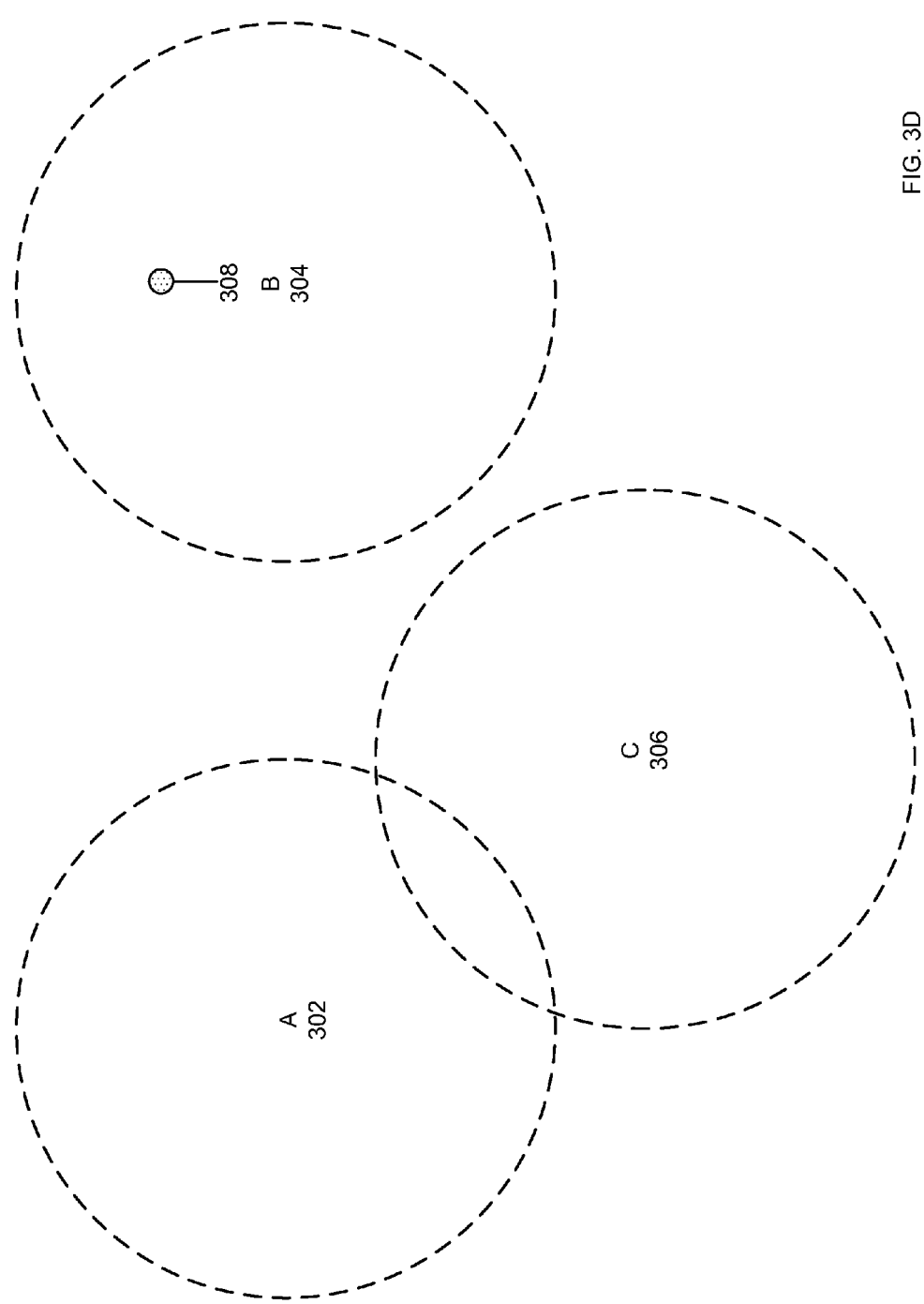

DETECTING LOCATION USING WIFI HOTSPOTS

CROSS REFERENCE TO RELATED APPLICATIONS

This application is a continuation of and claims priority to U.S. patent application Ser. No. 13/801,340, filed on Mar. 13, 2013 which is a non-provisional of U.S. Provisional Patent Application No. 61/613,815, filed on Mar. 21, 2012, the entire contents of which are hereby incorporated by reference.

TECHNICAL FIELD

This disclosure relates to detecting location of a mobile device.

BACKGROUND

A mobile device can detect geofences. A geofence is a virtual perimeter around a real world geographic area. The mobile device can determine when it enters or exits a geofence by constantly comparing the mobile device's current location to the location of the geofence.

Generally, to obtain a current location, a mobile device can use data based on three various sources: 1) WiFi hotspots, 2) cellular towers, or 3) a Global Positioning System (GPS). Obtaining a location from these three sources require differing amounts of battery consumption. For example, finding the current location through WiFi hotspots is less battery intensive than finding the current location through a GPS. In the case of detecting geofences, to save battery, the mobile device attempts to obtain the current location first through WiFi hotspot data, then cellular tower data, and finally GPS signal data.

SUMMARY

A mobile device can detect location using data from a WiFi-based location lookup system. The mobile device can send, using a network-based lookup, surrounding WiFi hotspot data to the location lookup system and receive a location.

To save battery, the mobile device refrains from performing network based lookups (e.g., using the Internet) until the surrounding hotspots are substantially different from previously stored hotspots. The mobile device can determine whether there is a substantial difference by determining whether a difference threshold is satisfied. When the difference threshold is satisfied, the mobile device performs a network based lookup to detect location from the location lookup system based on the surrounding hotspots.

In one aspect, a method of detecting location includes receiving, on a mobile device, a plurality of previously stored WiFi hotspots; detecting, on the mobile device, a plurality of surrounding WiFi hotspots; comparing the plurality of surrounding WiFi hotspots to determine one or more differences between the plurality of previously stored WiFi hotspots; determining the differences satisfy a difference threshold; sending the plurality of surrounding WiFi hotspots to a location lookup system; and receiving a response from the location lookup system.

Implementations may include one or more of the following features. The response includes a current location of the mobile device. The response is an indication that a current location cannot be established by the location lookup system based on the plurality of surrounding WiFi hotspots. Obtaining a current location using data acquired from a cellular tower. Obtaining a current location using a Global Positioning System (GPS). The one or more differences are that one of the two pluralities includes one or more hotspots that are not included in the other plurality. The one or more differences include differences between signal level strength between the plurality of surrounding WiFi hotspots and the plurality of previously stored WiFi hotspots. Determining the mobile device is within a predetermined distance of a location of interest; and sending a notification to the mobile device. Data in the location lookup system includes associations between WiFi hotspots and respective locations of the WiFi hotspot. The difference threshold is associated with one or more of the following: a number of additional hotspots, a number of missing hotspots, or signal strengths of hotspots.

In one aspect, a method of detecting location includes receiving, on a mobile device, a plurality of previously stored WiFi hotspots; detecting, on the mobile device, a plurality of surrounding WiFi hotspots; comparing the plurality of surrounding WiFi hotspots to determine one or more differences between the plurality of previously stored WiFi hotspots; determining the differences satisfy a difference threshold; and obtaining a current location using data acquired from a cellular tower.

Implementations may include one or more of the following features. The one or more differences are that one of the two pluralities includes one or more hotspots that are not included in the other plurality. The one or more differences include differences between signal level strength between the plurality of surrounding WiFi hotspots and the plurality of previously stored WiFi hotspots. Determining the current location of the mobile device is within a predetermined distance of a location of interest; and sending a notification to the mobile device. The difference threshold is associated with one or more of the following: a number of additional hotspots, a number of missing hotspots, or signal strengths of hotspots.

Advantages may include one or more of the following. A mobile device can save battery life by performing network based lookups only when a mobile device's location has changed.

BRIEF DESCRIPTION OF THE DRAWINGS

FIGS. 3A-D are diagrams of an example mobile device located at various locations over time.

Like reference numbers and designations in the various drawings indicate like elements.

DETAILED DESCRIPTION

Figure 1:
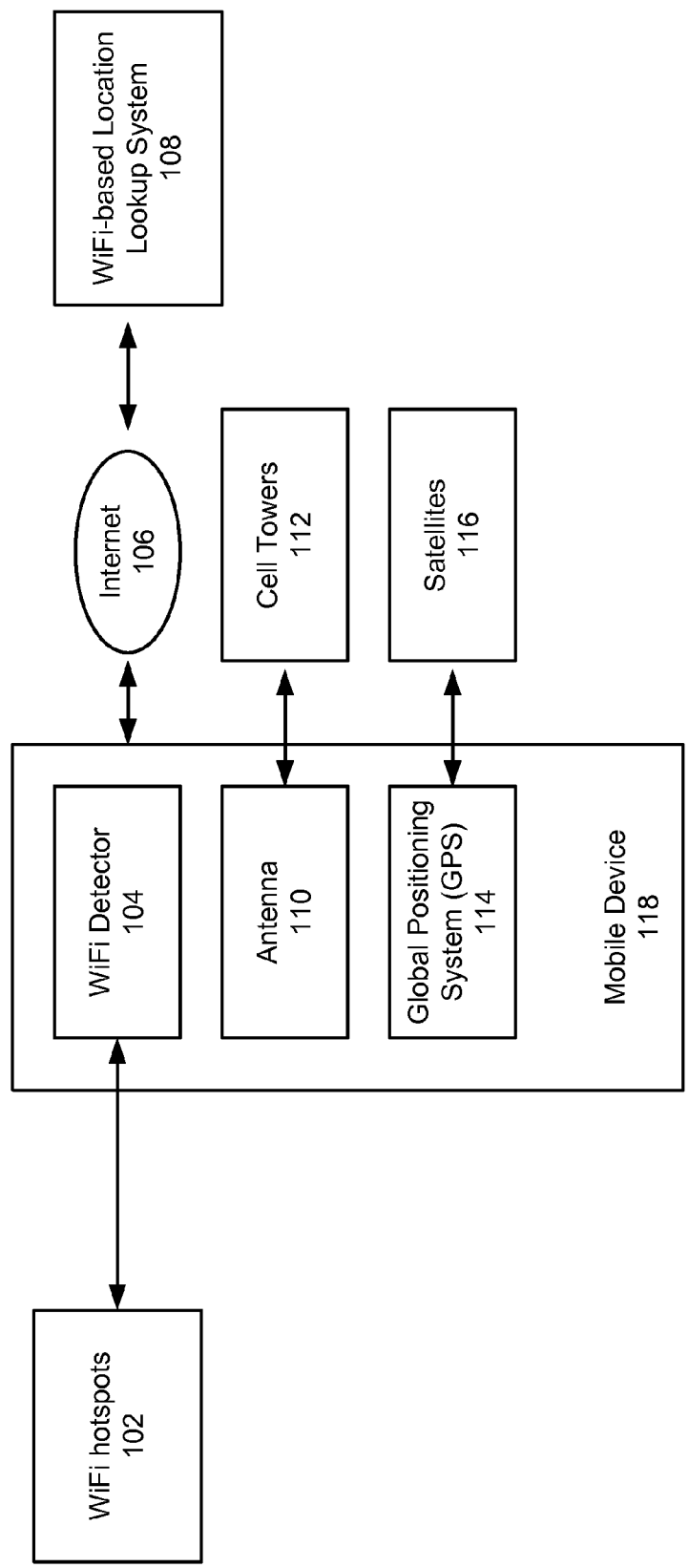
FIG. 1 is a schematic illustration of an example location detection system.

FIG. 1 is a schematic illustration of an example location detection system. The system includes a mobile device 118. The mobile device 118 can include a WiFi detector 104, antenna 110, and Global Positioning System (GPS) 114.

The mobile device 118 can detect location using data acquired from the WiFi detector 104 and a WiFi-based location lookup system 108. The WiFi detector 104 can detect WiFi hotspots 102 surrounding the mobile device 118. WiFi hotspots 102 are wireless local area networks and can be generated by wireless routers. The WiFi detector 104 can receive surrounding WiFi hotspot data. In some implementations, the WiFi hotspot data includes WiFi hotspot identifications (IDs) and respective WiFi hotspot signal strengths.

After receiving a list of WiFi hotspots, the WiFi detector 104 can perform a network-based lookup. Specifically, the mobile device 118 sends a request to the WiFi-based location lookup system 108 over an external network (e.g., the Internet 106). The WiFi-based location system 108 receives the list of WiFi hotspots and sends back a location to the mobile device 118 based on the list of WiFi hotspots. Detecting surrounding WiFi hotspots does not require as much battery as performing the network-based lookup (e.g., sending an Internet request).

The WiFi-based location system 108 includes one or more databases that include data associating WiFi hotspots with respective locations of the WiFi hotspots. In some implementations, the WiFi-based location system 108 accumulates this data whenever a mobile device requests a current location using GPS. The mobile device can obtain its location using GPS. The mobile device can also obtain a list of WiFi hotspots that surround the mobile device (e.g., using a WiFi detector). The mobile device can send, to the WiFi-based location system 108, the mobile device's GPS-acquired location and the list of surrounding WiFi hotspots. By accumulating this data sent from many mobile devices, the WiFi-based location system 108 can provide an estimated location based on a list of WiFi hotspots.

If the WiFi-based location lookup system 108 is unable to provide the mobile device 118 with a location (e.g., the location lookup system does not contain enough data), the mobile device 118 can detect location using a network based lookup by the antenna 110. In some implementations, the mobile device 118 uses the antenna 110 to send a location request (e.g., including cell tower signal strengths) to one or more cell towers 112. The cell towers 112 can respond with data that includes the mobile device's location. In some implementations, the mobile device 118 receives data from the antenna 110 that includes signal strengths of one or more surrounding cellular towers 112. The mobile device 118 can calculate the mobile device's location through triangulation based on cellular tower signal strength.

If the mobile device's location cannot be triangulated by cellular towers (e.g., not enough cellular towers around the mobile device are available), the mobile device 118 can detect location using data acquired from the GPS 114. The GPS 114 can analyze data received from one or more satellites 116 (e.g., one or more timecodes). The analyzed data can provide a location to the mobile device 118 (e.g., delays in the timecodes indicate the location of the device).

Figure 2:
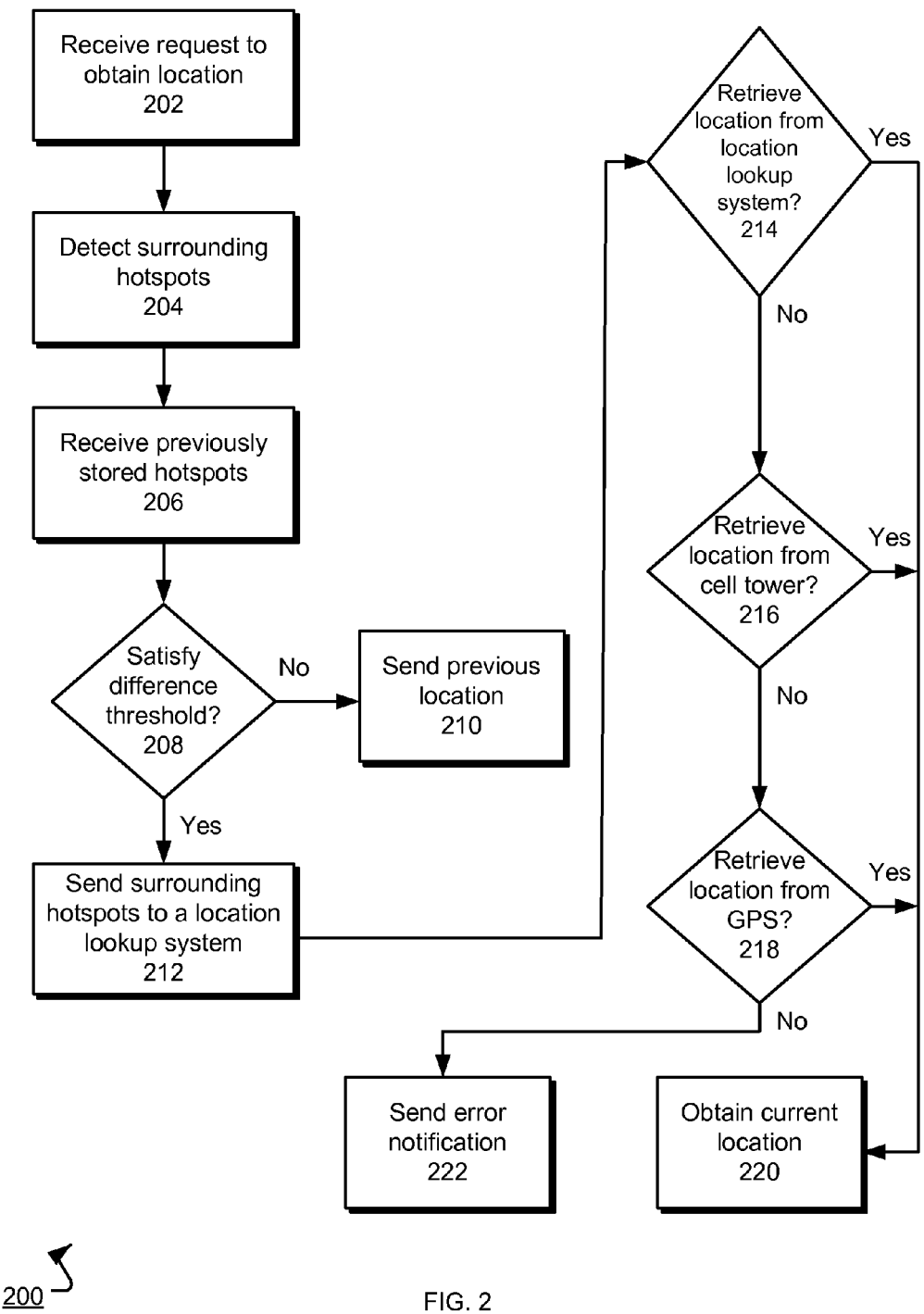
FIG. 2 is a diagram of an example flow chart of a method for detecting location of a mobile device.

FIG. 2 is a diagram of an example flow chart of a method 200 for detecting location of a mobile device. The mobile device first receives a request to obtain a current location (step 202). The request can be sent from an operating system or software application on the mobile device. In some implementations, the request is periodically recurring (e.g., a request to detect whether the mobile device enters or exits a geofence). The mobile device detects surrounding WiFi hotspots (step 204). The mobile device then receives a list of previously stored hotspots (step 206) (e.g., from an internal database).

If there are no previously stored hotspots, the mobile device sends the surrounding hotspots to a location lookup system (see step 212 below). If there are previously stored hotspots, the mobile device determines whether the surrounding WiFi hotspots are substantially different from the previously stored hotspots. The mobile device does this by determining whether a difference threshold is satisfied (step 208). The difference threshold is discussed further below in reference to FIGS. 3A-D.

If the surrounding hotspots do not satisfy the difference threshold, the mobile device sends a previously stored location (e.g., based on the previously stored surrounding hotspots) to the mobile device as the current location (step 210). WiFi hotspots can be assumed to be stationary. Therefore, a mobile device that does not detect a substantial difference (e.g., does not satisfy a difference threshold) in the surrounding WiFi hotspots can be inferred to be in the same location as the previously stored location.

In some implementations, if the surrounding hotspots satisfy the difference threshold, the mobile device sends the surrounding hotspots to a location lookup system (step 212). In some implementations, the mobile device sends both surrounding hotspot information and surrounding cellular tower data (e.g., identification and signal strength of cell towers). The location lookup system then determines whether it can provide a current location based on the surrounding WiFi hotspots (step 214). If the location lookup system can provide the current location, the location lookup system sends the location to the mobile device (step 220).

If the location lookup system cannot provide the current location, the mobile device determines whether the mobile device can retrieve the location from a cellular tower (step 216). Again, if the cellular tower is able to provide cell tower signal strength and triangulation data, the mobile device can obtain its current location (step 220). In some implementations, the location lookup system is bypassed. In other words, if the surrounding hotspots satisfy the difference threshold, the mobile device does not attempt to send the surrounding hotspots to the location lookup system. Instead, the mobile device performs a network-based lookup to obtain the location using a cellular tower.

If the cellular tower is unable to provide the current location, the mobile device can retrieve the location from a GPS in the mobile device (step 218). If the GPS is able to provide the current location, the mobile device has obtained its current location (step 220). Otherwise, the mobile device can send an error notification to the requester indicating that the mobile device is unable to obtain the current location (step 222). The requester can be a hardware or software component (e.g., operating system or application) of the mobile device.

Figure 3A:
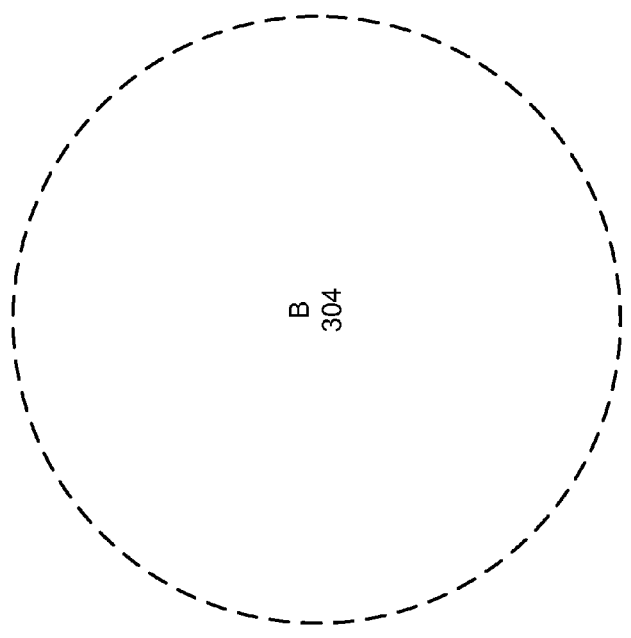
Figure 3A:
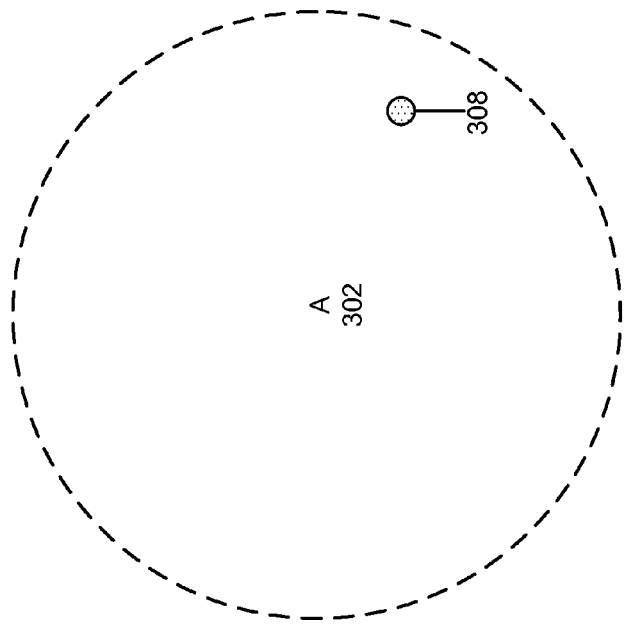

FIG. 3A is a diagram of an example mobile device located within range of a WiFi hotspot. The mobile device 308 can detect the WiFi hotspot that has an identification of hotspot A 302. The mobile device 308 is unable to detect hotspot B 304 because the mobile device 308 is out of range. The mobile device 308 can store hotspot A as a previously identified hotspot.

FIG. 3B is a diagram of the example mobile device that detects differences between the surrounding hotspots compared to the surrounding hotspot in reference to FIG. 3A. The mobile device 308 is in the same location as the mobile device in reference to FIG. 3A. Despite not having changed locations, the mobile device 308 is now able to detect hotspots A 302 and B 304. The mobile device 308 is still unable to detect hotspot C 306.

The list of surrounding hotspots in reference to FIG. 3B is different than the list of previously stored hotspots in reference to FIG. 3A. For example, the list of surrounding hotspots in reference to FIG. 3B includes hotspot A 302 and hotspot B 304. In contrast, the list of previously stored hotspots in reference to FIG. 3A only includes hotspot A 302. However, the mobile device 118 may not consider this to be substantially different (e.g., does not satisfy a difference threshold).

In some implementations, this is substantially different because the mobile device in reference to FIG. 3B detects an additional hotspot. In alternative implementations, detecting one additional hotspot does not meet a difference threshold. The difference threshold protects the mobile device 308 from mistakenly performing a network lookup in a situation where there are differences in the surrounding WiFi hotspots, but the mobile device 308 has not changed locations. This situation can occur if, for example, hotspot B 304 is a mobile hotspot. This situation can also occur if Hotspot B 304 also may have been temporarily unavailable during the time when the mobile device in reference to FIG. 3A detected hotspots. In some implementations, the difference threshold is based on a number of hotspot differences (e.g., the number of additional or missing WiFi hotspots). In alternative implementations, the difference threshold is based on a percentage of hotspot differences.

FIG. 3C is a diagram of the example mobile device that detects substantial differences between surrounding hotspots compared to the surrounding hotspots in reference to FIG. 3B. The mobile device 308 is in a different location than the mobile device 308 in reference to FIGS. 3A and 3B. In reference to FIG. 3B, the mobile device detects hotspots A 302 and C 306. In reference to FIG. 3C, the mobile device only detects hotspot B 304. These hotspots have no overlap. In some implementations, having no overlapping hotspots satisfies the difference threshold, indicating the mobile device is in another location.

FIG. 3D is a diagram of the example mobile device at a location having a stronger signal strength than the location in reference to FIG. 3C. Hotspot B 304 can provide stronger signal strength to mobile devices that are close to the hotspot provider (e.g., a router). Therefore, the hotspot signal strength in reference to FIG. 3C is weak compared to the hotspot signal strength in reference to FIG. 3D. In some implementations, the mobile device 308 considers the difference in signal strength to be a substantial difference (e.g., satisfying a difference threshold). In some implementations, the difference threshold is based on both differences in the number of mobile hotspots and differences in the signal strengths of the mobile hotspots. In alternative implementations, the mobile device 308 does not consider signal strength when determining whether there is a substantial difference between surrounding hotspots.

In some implementations, after obtaining a current location using the methods described above, a mobile device determines whether the mobile device is within a predetermined distance of a location of interest (e.g., whether it enters or exits a geofence). If the mobile device is within the predetermined distance, the mobile device can send a notification to a recipient (e.g., an application or operating system) indicating the occurrence. The recipient of the notification can perform operations based on the occurrence (e.g., notify a third party that the mobile device is within the geofence).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A method comprising:
  detecting, by a mobile device and at a first time, one or more wireless local area networks;
  storing first information regarding the one or more wireless local area networks detected by the mobile device at the first time;
  detecting, by the mobile device and at a second time that is subsequent to the first time, one or more wireless local area networks;
  storing second information regarding the one or more wireless local area networks detected by the mobile device at the second time;

comparing the first information to the second information to identify one more differences between the first information and the second information;

determining that the one or more differences between the first information and the second information indicate that at least one of (i) the one or more wireless local area networks detected by the mobile device at the first time does not include at least one of the one or more wireless local area networks detected by the mobile device at the second time, (ii) that the one or more wireless local area networks detected by the mobile device at the second time does not include at least one of the one or more wireless local area networks detected by the mobile device at the first time, or (iii) a signal strength between the mobile device and a particular wireless local area network of the one or more wireless local area networks detected at the first time is different than, by more than a threshold amount, a signal strength between the mobile device and the particular wireless local area network at the second time; and sending, at least partly in response to the determining, at least a portion of the second information to a location lookup system.

2. The method of claim 1, further comprising receiving an indication of a current location of the mobile device from the location lookup system.

3. The method of claim 1, wherein:
the first information represents a respective identifier of each wireless local area network of the one or more wireless local area networks detected by the mobile device at the first time; and
the second information represents a respective identifier of each wireless local area network of the one or more wireless local area networks detected by the mobile device at the second time.

4. The method of claim 3, wherein the determining comprises determining that the one or more differences between the first information and the second information indicate at least one of: (1) that the one or more wireless local area networks detected by the mobile device at the first time does not include at least one of the one or more wireless local area networks detected by the mobile device at the second time, or (2) that the one or more wireless local area networks detected by the mobile device at the second time does not include at least one of the one or more wireless local area networks detected by the mobile device at the first time.

5. The method of claim 1, wherein:
the first information represents a respective signal strength between the mobile device and each wireless local area network of the one or more wireless local area networks detected by the mobile device at the first time; and
the second information represents a respective signal strength between the mobile device and each wireless local area network of the one or more wireless local area networks detected by the mobile device at the second time.

6. The method of claim 5, wherein the determining comprises determining that the one or more differences between the first information and the second information indicate that the signal strength between the mobile device and the particular wireless network at the first time is different than, by more than the threshold amount, the signal strength between the mobile device and the particular wireless network at the second time.

7. The method of claim 1, wherein:
the first information represents: (1) a respective identifier of each wireless local area network of the one or more wireless local area networks detected by the mobile device at the first time, and (2) a respective signal strength between the mobile device and each wireless local area network of the one or more wireless local area networks detected by the mobile device at the first time; and
the second information represents: (1) a respective identifier of each wireless network of the one or more wireless local area networks detected by the mobile device at the second time, and (2) a respective signal strength between the mobile device and each wireless local area network of the one or more wireless local area networks detected by the mobile device at the second time.

8. The method of claim 1, further comprising receiving an indication that a current location of the mobile device cannot be established by the location lookup system based on the sent portion of the second information.

9. The method of claim 8, further comprising obtaining the current location of the mobile device using data acquired from a cellular tower at least partly in response to the receiving of the indication that the current location of the mobile device cannot be established by the location lookup system.

10. The method of claim 8, further comprising obtaining a current location of the mobile device using a Global Positioning System (GPS) of the mobile device at least partly in response to the receiving of the indication that the current location of the mobile device cannot be established by the location lookup system.

11. A method comprising:
detecting, by a mobile device and at a first time, one or more access points;
storing first information regarding the one or more access points detected by the mobile device at the first time;
detecting, by the mobile device and at a second time that is subsequent to the first time, one or more access points;
storing second information regarding the one or more access points detected by the mobile device at the second time;
comparing the first information to the second information to identify one more differences between the first information and the second information;
determining that the one or more differences between the first information and the second information indicate that at least one of (i) the one or more access points detected by the mobile device at the first time does not include at least one of the one or more access points detected by the mobile device at the second time, (ii) that the one or more access points detected by the mobile device at the second time does not include at least one of the one or more access points detected by the mobile device at the first time, or (iii) a difference between a signal strength between the mobile device and a particular access point of the one or more access points detected at the first time, and a signal strength between the mobile device and the particular access point at the second time satisfies a threshold; and
attempting, at least partly in response to the determining, to obtain a current location of the mobile device.

12. The method of claim 11, wherein the attempting to obtain the current location of the mobile device comprises sending at least a portion of the second information to a location lookup system that stores associations between access points and respective locations of the access points.

13. The method of claim 11, wherein the attempting to obtain the current location of the mobile device comprises attempting to obtain the current location of the mobile device using data acquired from a cellular tower.

14. The method of claim 11, wherein the attempting to obtain the current location of the mobile device comprises attempting to obtain the current location of the mobile device using a Global Positioning System (GPS) of the mobile device.

15. The method of claim 11, wherein:
the first information represents a respective identifier of each access point of the one or more access points detected by the mobile device at the first time; and
the second information represents a respective identifier of each access point of the one or more access points detected by the mobile device at the second time.

16. The method of claim 15, wherein the determining comprises determining that the one or more differences between the first information and the second information indicate at least one of: (1) that the one or more access points detected by the mobile device at the first time does not include at least one of the one or more access points detected by the mobile device at the second time, or (2) that the one or more access points detected by the mobile device at the second time does not include at least one of the one or more access points detected by the mobile device at the first time.

17. A mobile device comprising:
a processor; and
non-transitory computer-readable medium coupled to the processor and having instructions stored thereon, which, when executed by the processor, cause the processor to perform operations comprising:
detecting, by a mobile device at a first time, one or more wireless local area networks;
storing first information regarding the one or more wireless local area networks detected by the mobile device at the first time;
detecting, by the mobile device and at a second time that is subsequent to the first time, one or more wireless local area networks;
storing second information regarding the one or more wireless local area networks detected by the mobile device at the second time;
comparing the first information to the second information to identify one more differences between the first information and the second information;
determining that the one or more differences between the first information and the second information indicate that at least one of (i) the one or more wireless local area networks detected by the mobile device at the first time does not include at least one of the one or more wireless local area networks detected by the mobile device at the second time, (ii) that the one or more wireless local area networks detected by the mobile device at the second time does not include at least one of the one or more wireless local area networks detected by the mobile device at the first time, or (iii) a signal strength between the mobile device and a particular wireless local area network of the one or more wireless local area networks detected at the first time is different than, by more than a threshold amount, a signal strength between the mobile device and the particular wireless local area network at the second time; and
attempting, at least partly in response to the determining, to obtain a current location of the mobile device.

18. The mobile device of claim 17, wherein the attempting to obtain the current location of the mobile device comprises at least one of:
sending at least a portion of the second information to a location lookup system that stores associations between wireless local area networks and respective locations of the wireless local area networks;
attempting to obtain the current location of the mobile device using data acquired from a cellular tower; or
using a Global Positioning System (GPS) of the mobile device.

19. The mobile device of claim 17, wherein:
the first information represents a respective signal strength between the mobile device and each wireless local area network of the one or more wireless local area networks detected by the mobile device at the first time; and
the second information represents a respective signal strength between the mobile device and each wireless local area network of the one or more wireless local area networks detected by the mobile device at the second time.

20. The mobile device of claim 19, wherein the determining comprises determining that the one or more differences between the first information and the second information indicate that the signal strength between the mobile device and the particular wireless local area network at the first time is different than, by more than the threshold amount, the signal strength between the mobile device and the particular wireless local area network at the second time.

* * * * *